(12) United States Patent
Jung et al.

(10) Patent No.: US 10,852,510 B2
(45) Date of Patent: Dec. 1, 2020

(54) OPTICAL LENS SYSTEM

(71) Applicant: ACE SOLUTECH CO., LTD., Seongnam-si (KR)

(72) Inventors: Pil Sun Jung, Gyeonggi-do (KR);
Dong Young Kim, Gyeonggi-do (KR);
Chi Ho An, Gyeonggi-do (KR)

(73) Assignee: ACE SOLUTECH CO., LTD. (KR)

( * ) Notice: Subject to any disclaimer, the term of this patent is extended or adjusted under 35 U.S.C. 154(b) by 845 days.

(21) Appl. No.: 15/463,069

(22) Filed: Mar. 20, 2017

(65) Prior Publication Data

US 2017/0269339 A1    Sep. 21, 2017

(30) Foreign Application Priority Data

Mar. 21, 2016    (KR) .................. 10-2016-0033673

(51) Int. Cl.
*G02B 9/62* (2006.01)
*G02B 13/00* (2006.01)

(52) U.S. Cl.
CPC ........... *G02B 13/0045* (2013.01); *G02B 9/62* (2013.01)

(58) Field of Classification Search
CPC .. G02B 13/0045; G02B 13/002; G02B 13/00; G02B 9/00; G02B 9/62
USPC ......................................................... 359/713
See application file for complete search history.

(56) References Cited

U.S. PATENT DOCUMENTS

| | | | | |
|---|---|---|---|---|
| 9,952,404 | B2* | 4/2018 | Son | G02B 9/62 |
| 10,054,766 | B2* | 8/2018 | Shin | G02B 27/0025 |
| 10,133,030 | B2* | 11/2018 | Park | G02B 13/0045 |
| 10,295,793 | B2* | 5/2019 | Wenren | G02B 13/0045 |
| 10,451,841 | B2* | 10/2019 | Jung | G02B 13/0045 |
| 10,564,394 | B2* | 2/2020 | Sekine | G02B 27/0037 |
| 2015/0098135 | A1 | 4/2015 | Chung et al. | |
| 2015/0212296 | A1* | 7/2015 | Huang | G02B 13/0045 348/335 |

(Continued)

FOREIGN PATENT DOCUMENTS

| | | |
|---|---|---|
| KR | 20160075015 | 6/2016 |
| KR | 20160095935 | 8/2016 |

OTHER PUBLICATIONS

Korean Office Action, Korean Application No. 10-2016-0033673, dated Jul. 17, 2017.

(Continued)

*Primary Examiner* — William R Alexander
(74) *Attorney, Agent, or Firm* — Perman & Green, LLP

(57) ABSTRACT

Disclosed is a photographic optical lens system. The disclosed photographic optical lens system includes a stop, a lens group including at least one aspherical lens, and an image sensor configured to record an image transmitted through the lens group, wherein the photographic optical lens system satisfies the following Expression:

$$0.15 \leq (D_{L1-L2})/OAL \leq 0.4 \qquad \text{<Expression>}$$

where $D_{L1-L2}$ in Expression denotes a distance from a center of a first surface of a lens closest to an object (hereinafter, referred to as a first lens) to a center of a second surface of a second lens arranged directly next to the first lens, and OAL denotes a distance (a total length of the lens group) from the center of the first surface of the first lens to a center of a second surface of a lens arranged farthest from the object.

15 Claims, 12 Drawing Sheets

(56) References Cited

U.S. PATENT DOCUMENTS

2016/0178871 A1    6/2016   You
2016/0223797 A1    8/2016   Zhao

OTHER PUBLICATIONS

Korean Office Action, Korean Application No. 10-2016-0158431, dated Jul. 17, 2017.
Korean Office Action, Korean Application No. 10-2016-0033673, dated Dec. 7, 2017.

* cited by examiner

OPTICAL LENS SYSTEM

CROSS-REFERENCE TO RELATED APPLICATION

This application claims the benefit of Korean Patent Application No. 10-2016-0033673, filed on Mar. 21, 2016, in the Korean Intellectual Property Office, the disclosure of which is incorporated herein in its entirety by reference.

BACKGROUND

1. Field

One or more aspects of the disclosed embodiment relate to an optical system including a plurality of lenses, and more particularly, to an optical lens system that can be mounted on an apparatus capable of capturing an image.

2. Brief Description of Related Developments

Recently, various composite apparatuses formed by combining a plurality of apparatuses are being introduced. A combination of a mobile phone and a camera may be a representative example of the composite apparatus. Since a mobile phone itself has various functions, a space in which a camera may be mounted on the mobile phone is not large. Therefore, a camera to be mounted on a mobile phone needs to be miniaturized and slimmed. In addition, the camera to be mounted on a mobile phone needs to be lightweight. Accordingly, although a compact lens is implemented by using plastic as a material of a camera lens, there are limits to be overcome in terms of performance.

SUMMARY

One or more aspects of the disclosed embodiment include a photographic optical lens system which is small and lightweight and has a high-resolution and a wide angle viewing range.

Additional aspects of the disclosed embodiment will be set forth in part in the description which follows and, in part, will be apparent from the description, or may be learned by practice of the presented aspects of the disclosed embodiment.

According to one or more aspects of the disclosed embodiment, a photographic optical lens system includes a stop, a lens group including at least one aspherical lens, and an image sensor configured to record an image transmitted through the lens group, wherein the photographic optical lens system satisfies the following Expression:

$$0.15 \leq (D_{L1-L2})/OAL \leq 0.4 \qquad \text{<Expression>}$$

where, in Expression, $D_{L1-L2}$ denotes a distance from a center of a first surface of a lens (hereinafter, referred to as a first lens) closest to an object to a center of a second surface of a second lens arranged directly next to the first lens, and OAL denotes a distance (a total length of the lens group) from the center of the first surface of the first lens to a center of a second surface of a lens arranged farthest from the object.

In the optical lens system, the lens group may include a total of six lenses sequentially arranged on the same optical axis, including the first and second lenses.

The optical lens system may further include a specific wavelength blocking portion provided between the lens group and the image sensor.

The stop may be arranged next to the second lens. For example, when a lens arranged next to the second lens is referred to as a third lens, the stop may be arranged between a second surface of the third lens and the second lens.

A refractive power of an odd-numbered lens and a refractive power of an even-numbered lens among the plurality of lenses included in the lens group may be opposite to each other.

An effective diameter of the first lens among the six sequentially arranged lenses may be greater than an effective diameter of the third lens and may be smaller than an effective diameter of a sixth lens.

An effective diameter of the first lens among the six sequentially arranged lenses may be equal to an effective diameter of a third lens.

An effective diameter of the first lens among the six sequentially arranged lenses may be equal to an effective diameter of a sixth lens.

An effective diameter of the first lens among the six sequentially arranged lenses, an effective diameter of a third lens, and an effective diameter of a sixth lens may be the same.

A refractive index of a third lens among the six sequentially arranged lenses may be smaller than a refractive index of a fourth lens.

An Abbe's number of a third lens among the six sequentially arranged lenses may be greater than an Abbe's number of a fourth lens.

The first lens, a third lens, and a sixth lens among the six sequentially arranged lenses may satisfy the following Expression:

$$DL3 \leq DL1 \leq DL6 \qquad \text{<Expression>}$$

where DL1, DL3, and DL6 respectively denote effective diameters of the first lens, the third lens, and the sixth lens.

A third lens and a fourth lens among the six sequentially arranged lenses may satisfy the following Expression:

$$0.7 \leq Ind3/Ind4 < 1.5 \qquad \text{<Expression>}$$

where Ind3 denotes a refractive index of the third lens and Ind4 denotes a refractive index of the fourth lens.

The optical lens system may satisfy the following Expressions:

$$85 \leq FOV \leq 150 \qquad \text{<Expression>}$$

where FOV denotes an effective viewing angle of the optical lens system.

$$0.6 \leq TTL/IH \leq 0.9 \qquad \text{<Expression>}$$

where IH denotes a height of an effective image and TTL denotes a distance from a center of the first surface of the first lens to the image sensor.

The third lens and the fourth lens may satisfy the following Expression:

$$1.5 \leq Abv3/Abv4 \leq 3.0 \qquad \text{<Expression>}$$

where Abv3 denotes the Abbe's number of the third lens and Abv4 denotes the Abbe's number of the fourth lens.

BRIEF DESCRIPTION OF THE DRAWINGS

These and/or other aspects of the disclosed embodiment will become apparent and more readily appreciated from the following description of the aspects of the disclosed embodiment, taken in conjunction with the accompanying drawings in which.

DETAILED DESCRIPTION

Figure 1:
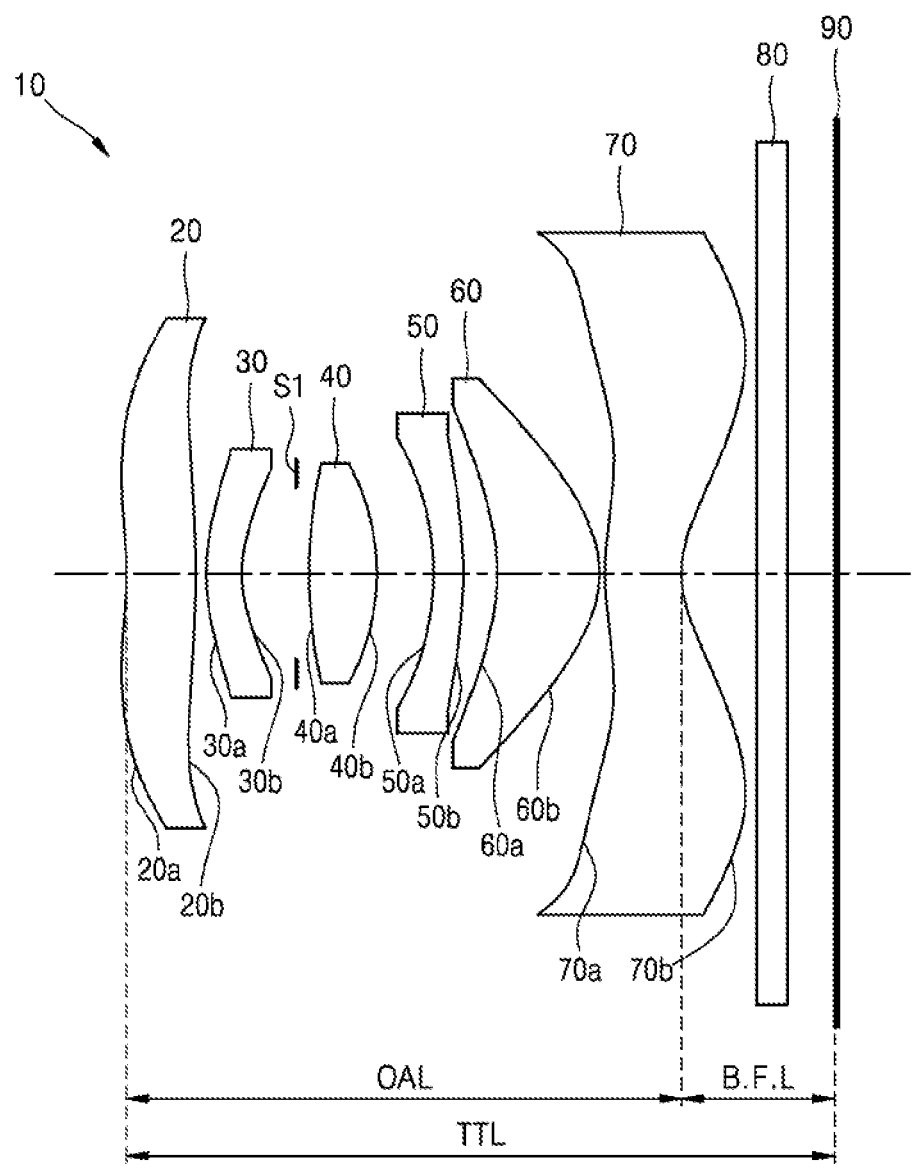
FIG. 1 is a cross-sectional view illustrating a photographic optical lens system (a first optical lens system) according to one aspect of the disclosed embodiment.

Reference will now be made in detail to aspects of the disclosed embodiment, examples of which are illustrated in the accompanying drawings, wherein like reference numerals refer to like elements throughout. In this regard, the present aspects of the disclosed embodiment may have different forms and should not be construed as being limited to the descriptions set forth herein. Accordingly, the aspects of the disclosed embodiment are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, photographic optical lens systems according to various aspects of the disclosed embodiment will be described in detail with reference to the accompanying drawings. Thicknesses of layers or regions illustrated in the drawings during the description are exaggerated for clarity of description. In the following description, the same reference numerals denote the same members.

In the following description, a first surface of each lens represents an incident surface on which light is incident, and a second surface represents an emission surface through which light is emitted.

FIG. 1 illustrates a photographic optical lens system (hereinafter, referred to as a first optical lens system) according to an example aspect.

Referring to FIG. 1, a first optical lens system 10 includes a lens group. The lens group includes a plurality of lenses. The plurality of lenses may include at least one aspherical lens. Also, at least one of a light incident surface and light emission surface of one lens, which is selected from the plurality of lenses included in the first optical lens system 10, may be an aspherical surface. The first optical lens system 10 may include first, second, third, fourth, fifth, and sixth lenses 20, 30, 40, 50, 60, and 70 as an example of the lens group. The total number of lenses of the first optical lens system 10 may be more or less than six. The first optical lens system 10 may further include a stop S1, a specific wavelength blocking portion 80, and an image sensor 90, and may include a member other than these members as necessary. The first to sixth lenses 20 to 70 may be sequentially arranged between an object to be photographed and the image sensor 90. Therefore, the object may be located in front of the first lens 20. The first to sixth lenses 20 to 70 may be non-glass lenses and may be, for example, plastic lenses.

The first to sixth lenses 20 to 70 are sequentially arranged from the object toward the image sensor 90.

Light incident on the first lens 20 sequentially passes through the second to sixth lenses 30 to 70 and reaches the image sensor 90. The specific wavelength blocking portion 80 may be arranged between the sixth lens 70 and the image sensor 90. The specific wavelength blocking portion 80 may be, for example, an infrared blocking filter or a similar member, but the presently disclosed embodiment is not limited thereto, and the specific wavelength blocking portion 80 may be a filter or member which blocks other wavelengths.

The stop S1 may be located between the second lens 30 and a second surface 40$b$ of the third lens 40 within a range that does not deviate from the first optical lens system 10. For example, the stop S1 may be located between the second lens 30 and the third lens 40. Some light incident on the third lens 40 may be limited by the stop S1. The stop S1 may be located near a first surface 40$a$ of the third lens 40 and may manually or automatically adjust an amount of light incident on the third lens 40. Positions of the stop S1 and the blocking portion 80 may be adjusted as necessary. The image sensor 90 and the blocking portion 80 may be arranged to be parallel to each other. All of the stop S1, the first to sixth lenses 20 to 70, and the blocking portion 80 may be aligned on the same optical axis. The image sensor 90 may also be aligned on the optical axis.

Next, optical characteristics of the first to sixth lenses 20 to 70 included in the lens group will be described. Some of the first to sixth lenses 20 to 70 may have different refractive powers from those of the other lenses.

Specifically, the first lens 20 may be a lens having a positive refractive power. A first surface 20$a$ of the first lens 20 may be, for example, an aspherical surface. A center portion of a second surface 20$b$ of the first lens 20 may be convex toward the image sensor 90. The second surface 20$b$ may be, for example, an aspherical surface.

The second lens 30 located next to the first lens 20 may be a lens having a negative refractive power. A first surface 30$a$ of the second lens 30 may be a surface which is convex toward the first lens 20. The first surface 30$a$ of the second lens 30 may be, for example, an aspherical surface. A second surface 30$b$ of the second lens 30 may also be a surface which is convex toward the first lens 20. The second surface 30$b$ may be a curved surface and may be, for example, an aspherical surface.

The third lens 40 may be a lens having a positive refractive power. The first surface 40$a$ of the third lens 40 may be a curved surface which is convex toward the second lens 30. The first surface 40$a$ of the third lens 40 may be, for example, an aspherical surface. The second surface 40$b$ of the third lens 40 may be a curved surface which is convex toward the fourth lens 50 and may be, for example, an aspherical surface.

The fourth lens 50 may be a lens having a negative refractive power. The fourth lens 50 has a shape which is convex toward the image sensor 90 as a whole. Therefore, first and second surfaces 50$a$ and 50$b$ of the fourth lens 50 may be curved surfaces which are convex toward the image sensor 90 and may be, for example, aspherical surfaces.

The fifth lens 60 may be a lens having a positive refractive power. The fifth lens 60 may have a shape which is convex toward the image sensor 90 as a whole. A second surface 60$b$ of the fifth lens 60 may be more convex toward the image sensor 90 than a first surface 60$a$ of the fifth lens 60. All of the first surface 60$a$ and the second surface 60$b$ of the fifth lens 60 may be curved surfaces and may be, for example, aspherical surfaces. A center portion of the fifth lens 60 may be thicker than edges of the fifth lens 60.

The sixth lens 70 may be a lens having a negative refractive power. At least one of first and second surfaces 70a and 70b of the sixth lens 70 may be an aspherical surface. At least one of both of the surfaces of the sixth lens 70 may have at least one inflection point. For example, the second surface 70b of the sixth lens 70 may be an aspherical surface having one or more inflection points. A center portion of the first surface 70a of the sixth lens 70 may be convex toward the object, and a portion between edges and a center portion of the sixth lens 70 may be convex toward the image sensor 90. A center region including the optical axis of the second surface 70b of the sixth lens 70 may be concave with respect to the image sensor 90. That is, the center region of the second surface 70b may be convex toward the object. The second surface 70b has regions which are convex toward the image sensor 90 from the center region to the edges. That is, regions of the second surface 70b between the center region and the edges may be convex toward the image sensor 90. Thickest portions of the sixth lens 70 are located between the center region and the edges. A thickness of the center region (e.g., a thickness of a portion through which the optical axis passes) of the sixth lens 70 may be relatively thin.

In the first optical lens system 10, an effective diameter of the first lens 20 may be greater than that of the third lens 40. In another example, the effective diameter of the first lens 20 may be greater than that of the third lens 40. In still another example, the effective diameter of the first lens 20 may be smaller than or equal to that of the sixth lens 70.

The refractive powers of the above-described first to sixth lenses 20 to 70 may be distributed so that an aberration is minimized. For example, the refractive powers of the first to sixth lenses 20 to 70 may be distributed so that a chromatic aberration is minimized. For example, a lens having a relatively low refractive index may be used as the third lens 40 and a lens having a relatively high refractive index may be used as the fourth lens 50.

Also, the optical characteristics of the first to sixth lenses 20 to 70 may vary so that an aberration is minimized. For example, as a method of minimizing a chromatic aberration, a lens having a relatively high Abbe's number may be used as the third lens 40 and a lens having a relatively low Abbe's number may be used as the fourth lens 50.

When the first to sixth lenses 20 to 70 are arranged in this way, the first to sixth lenses 20 to 70 are arranged in consideration of some or all optical characteristics of the lenses, and thus an aberration of the first optical lens system 10 may be corrected.

A portion of the blocking portion 80 provided next to the sixth lens 70 may come into contact with the second surface 70b of the sixth lens 70 or may be spaced apart from the second surface 70b of the sixth lens 70.

An overall focal length and performance of the first optical lens system 10 may vary according to a thickness, a focal length, a position, and the like of each of the first to sixth lenses 20 to 70 included in the first optical lens system 10.

The first optical lens system 10 may satisfy the following Expressions 1 to 7, and the members included in the first optical lens system 10 may have optical characteristics causing the first optical lens system 10 to satisfy the following Expressions 1 to 7.

$$85 \leq FOV \leq 150 \qquad \text{<Expression 1>}$$

In Expression 1, FOV denotes an effective viewing angle, that is, a wide angle range, of the optical lens system. Considering the optical characteristics of the members included in the first optical lens system 10 to be described below, the first optical lens system 10 satisfies Expression 1. Therefore, the first optical lens system 10 may have a function of a wide-angle lens having a wide viewing angle.

$$0.6 \leq TTL/IH \leq 0.9 \qquad \text{<Expression 2>}$$

In Expression 2, IH denotes a height of an effective image and TTL denotes a total length of the optical lens system, which is measured along the optical axis, that is, a distance from a vertex (or the center) of the first surface of the first lens to the image sensor.

Expression 2 defines the overall length of the optical lens system with respect to a size of the image sensor. When the optical lens system satisfies Expression 2, a wide-angle and ultra-slim optical lens system may be manufactured. Therefore, when the first optical lens system 10 satisfies Expression 2, the first optical lens system 10 may be mounted on a small device, for example, a mobile communication device.

$$DL3 \leq DL1 \leq DL6 \qquad \text{<Expression 3>}$$

In Expression 3, DL1, DL3, and DL6 respectively denote effective diameters of the first lens, the third lens, and the sixth lens included in the optical lens system.

Expression 3 defines a size of an effective diameter of a lens. An optical lens system which satisfies Expression 3 may maintain high optical performance while implementing wide angle performance.

For example, in order for the first optical lens system 10 to satisfy Expression 3, the effective diameter of the first lens 20 may be greater than the effective diameter of the third lens 40 and smaller than the effective diameter of the sixth lens 70. In another aspect of the disclosed embodiment, the effective diameter of the first lens 20 may be equal to the effective diameter of the third lens 40. In still another aspect of the disclosed embodiment, the effective diameter of the first lens 20 may be equal to the effective diameter of the sixth lens 70.

<Expression 4>

A condition in which the stop is located between the third lens and the fourth lens as a condition in which a position of the stop is defined.

When the stop S1 of the first optical lens system 10 satisfies Expression 4, the first optical lens system 10 may maintain high optical performance while maintaining a wide angle.

$$0.15 \leq (D_{L1-L2})/OAL \leq 0.4 \qquad \text{<Expression 5>}$$

In Expression 5, $D_{L1-L2}$ denotes a distance from the center of the first surface of the first lens of the optical lens system to the center of the second surface of the second lens. Also, OAL denotes a distance from the center of the first surface of the first lens to the center of the second surface of the sixth lens. Therefore, Expression 5 defines a range of thicknesses of the first through second lenses with respect to a length (a total length) of the lens group. The fact that the optical lens system satisfies Expression 5 means that the corresponding optical lens system may achieve high performance while securing an ultra-wide viewing angle.

$$0.7 \leq Ind3/Ind4 < 1.1 \qquad \text{<Expression 6>}$$

In Expression 6, Ind3 denotes a refractive index of the third lens of the optical lens system and Ind4 denotes a refractive index of the fourth lens.

When the first optical lens system 10 satisfies Expression 6, the first optical lens system 10 may minimize an aberration, and may minimize, for example, a chromatic aberration.

$$1.5 \leq Abv3/Abv4 \leq 3.0 \qquad \text{<Expression 7>}$$

In Expression 7, Abv3 denotes an Abbe's number of the third lens of the optical lens system and Abv4 denotes an Abbe's number of the fourth lens.

When the first optical lens system 10 satisfies Expression 7, the first optical lens system 10 may minimize an aberration, and may minimize, for example, a chromatic aberration.

The following Table 1 illustrates variables related to Expressions 1 to 7, definitions of the variables, values of the variables, and values of Expressions 1 to 7 measured with those variable values in the first optical lens system 10.

TABLE 1

| Item | Value | Definition (Others) |
|---|---|---|
| IH | 6.87 | A height of an effective image |
| Semi IH | 3.43 | Half of a height of an effective image |
| TTL | 5.20 | A distance from the center of the top of a first lens to a sensor |
| OAL | 4.05 | A distance from the center of a first surface of a first lens to the center of a second surface of a sixth lens |
| FOV | 98.98 | An effective diameter of angle of view (a diagonal direction) |
| θ | 49.49 | Half of an effective diameter of angle of view (a diagonal direction) |
| E.F.L | 2.83 | A focal length of an optical lens system |
| B.F.L | 1.15 | A distance from the center of a second surface of a sixth lens to a sensor |
| Fno | 1.89 | E.F.L/EPD |
| tan(θd/2) | 0.461 | A tangent value of half of a θ value |
| DL1 | 3.893 | An effective diameter of a first lens (an aspherical surface) |
| DL3 | 1.660 | An effective diameter of a third lens (an aspherical surface) |
| DL6 | 5.710 | An effective diameter of a sixth lens (an aspherical surface) |
| $D_{L1-L2}$ | 0.852 | A distance from the center of a first surface to the center of a second surface of a second lens |
| Ind3 | 1.544 | A refractive index of a third lens |
| Ind4 | 1.650 | A refractive index of a fourth lens |
| Abv3 | 56.093 | An Abbe's number of a third lens |
| Abv4 | 21.474 | An Abbe's number of a fourth lens |
| Expression 1 | 98.98 | |
| Expression 2 | 0.76 | |
| Expression 3 | Satisfied | |
| Expression 4 | Satisfied | |
| Expression 5 | 0.21 | |
| Expression 6 | 0.94 | |
| Expression 7 | 2.61 | |

Referring to Table 1, it may be seen that the first optical lens system 10 satisfies Expression 1 to 7.

The following Table 2 illustrates an implementation example of optical characteristics for each of the members (the lenses, the stop, the blocking portion, and the image sensor) included in the first optical lens system 10, and illustrates radiuses of curvature (R), lens thicknesses or distances (T) between lenses or adjacent components, refractive indexes (Nd), and Abbe's numbers (Vd). The refractive index (Nd) denotes a refractive index of a lens measured using a d-line. The Abbe's number (Vd) denotes an Abbe's number of a lens with respect to a d-line. A mark * after a surface number indicates that the corresponding surface is an aspherical surface. Units of values of R and T are mm.

TABLE 2

| Component | Surface | R | T | Nd | Vd |
|---|---|---|---|---|---|
| First lens 20 | 20a* | −5.52860 | 0.50997 | 1.53175 | 55.85588 |
| | 20b* | −2.42434 | 0.06712 | — | — |
| Second lens 30 | 30a* | 1.68981 | 0.27441 | 1.63916 | 23.51650 |
| | 30b* | 1.19762 | 0.40201 | — | — |
| Stop S1 | — | Infinity | 0.09026 | — | — |
| Third lens 40 | 40a* | 4.22113 | 0.48002 | 1.54410 | 56.09278 |
| | 40b* | −2.44692 | 0.42651 | — | — |
| Fourth lens 50 | 50a* | −3.79995 | 0.20000 | 1.65041 | 21.47439 |
| | 50b* | −24.52324 | 0.24777 | — | — |
| Fifth lens 60 | 60a* | −2.31608 | 0.75051 | 1.54410 | 56.09278 |
| | 60b* | −0.85074 | 0.03000 | — | — |
| Sixth lens 70 | 70a* | 2.21906 | 0.56895 | 1.53175 | 55.85588 |
| | 70b* | 0.76645 | 0.56066 | — | — |
| Blocking portion 80 | Front surface | Infinity | 0.21000 | 1.51680 | 64.19733 |
| | Back surface | Infinity | 0.38680 | — | — |
| Image sensor 90 | — | Infinity | −0.00500 | — | — |

The aspherical surfaces of the first to sixth lenses 20 to 70 included in the first optical lens system 10 satisfy the following aspherical surface equation, Expression 8.

$$Z = \frac{Y^2}{R(1 + \sqrt{1 - (1+K)Y^2/R^2})} + AY^4 + BY^6 + CY^8 + DY^{10} + EY^{12} + FY^{14} + GY^{16} + HY^{18} + JY^{20} \qquad \text{< Expression 8 >}$$

In Expression 8, Z denotes a distance measured in an optical axis direction from a vertex of each lens to, Y denotes a distance in a direction perpendicular to the optical axis, R denotes a radius of curvature, K denotes a conic constant, and A, B, C, D, E, F, G, H, and J denote aspherical coefficients.

The following Table 3 illustrates aspherical coefficients of the lenses included in the first optical lens system 10.

TABLE 3

| Surface | K | A | B | C | D | E |
|---|---|---|---|---|---|---|
| 20a* | −99.77563 | 0.08774 | −0.05628 | 0.03630 | −0.01931 | 0.00856 |
| 20b* | −98.60463 | 0.08963 | −0.11761 | 0.12705 | −0.09576 | 0.04826 |
| 30a* | −0.22262 | 0.33339 | −2.65886 | 10.01128 | −27.56063 | 52.38082 |
| 30b* | 0.82648 | −0.41622 | 1.10972 | −9.09695 | 44.41684 | −143.03416 |
| 40a* | 0.40588 | 0.00168 | −0.06148 | −0.33661 | 4.06664 | −18.96472 |
| 40b* | 1.64341 | −0.14453 | 0.91069 | −6.86821 | 31.37089 | −91.50398 |
| 50a* | 6.99638 | −0.25815 | 0.21256 | −2.11620 | 9.60165 | −22.26753 |
| 50b* | 208.99956 | −0.10015 | −0.17798 | 0.28979 | 0.09896 | −0.55510 |
| 60a* | 1.73828 | 0.17094 | −0.11903 | −0.18967 | 0.53017 | −0.57535 |
| 60b* | −0.86927 | 0.31370 | −0.46747 | 0.70097 | −0.79238 | 0.58338 |

TABLE 3-continued

| | | | | | |
|---|---|---|---|---|---|
| 70a | −19.32692 | −0.06474 | −0.03170 | 0.04197 | −0.01926 | 0.00505 |
| 70b | −4.43809 | −0.07544 | 0.03513 | −0.01422 | 0.00440 | −0.00099 |

| Surface | F | G | H | J |
|---|---|---|---|---|
| 20a* | −0.00294 | 0.00069 | −0.00010 | 0.00001 |
| 20b* | −0.01613 | 0.00346 | −0.00044 | 0.00002 |
| 30a* | −66.12386 | 52.77386 | −24.04731 | 4.76027 |
| 30b* | 300.42903 | −396.28398 | 297.30021 | −96.98726 |
| 40a* | 47.80209 | −67.89631 | 51.31210 | −15.97398 |
| 40b* | 170.65581 | −196.43829 | 126.95012 | −35.11260 |
| 50a* | 31.21341 | −26.30813 | 12.20539 | −2.39211 |
| 50b* | 0.66062 | −0.41088 | 0.13377 | −0.01796 |
| 60a* | 0.41021 | −0.21265 | 0.07012 | −0.01024 |
| 60b* | −0.23918 | 0.04277 | 0.00055 | −0.00081 |
| 70a* | −0.00080 | 0.00007 | 0.00000 | 0.00000 |
| 70b* | 0.00015 | −0.00001 | 0.00000 | 0.00000 |

Figure 2:
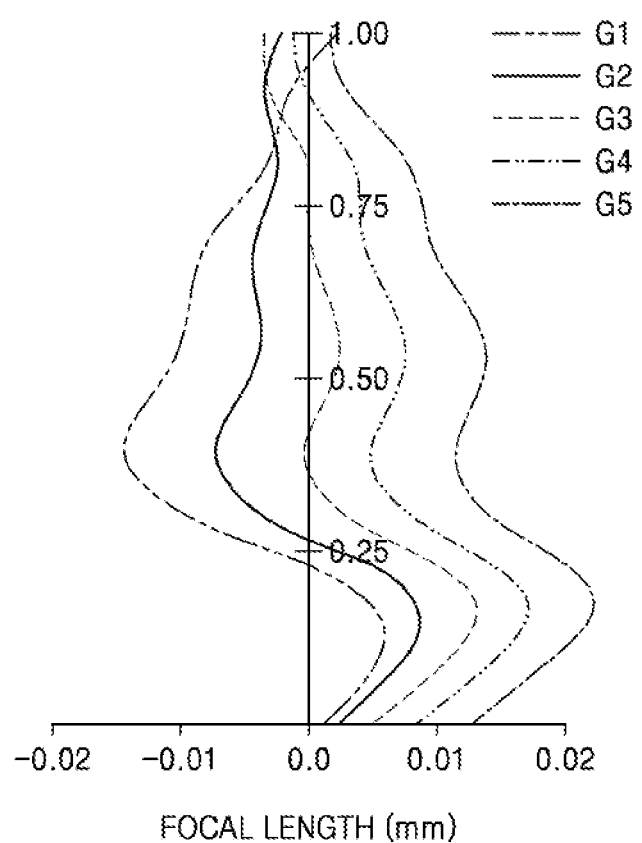
FIGS. 2 to 4 are aberration diagrams illustrating longitudinal spherical aberrations, astigmatic field curvatures, and distortion of the first optical lens system.

FIG. 2 illustrates longitudinal spherical aberrations of the first optical lens system 10 when the lenses included in the first optical lens system 10 have dimensions and aspherical coefficients according to the above implementation example. In FIG. 2, a first graph G1 illustrates a result when a wavelength of incident light is 435.8343 nm and a second graph G2 illustrates a result when a wavelength of incident light is 486.1327 nm. A third graph G3 illustrates a result when a wavelength of incident light is 546.0740 nm, and a fourth graph G4 illustrates a result when a wavelength of incident light is 587.5618 nm. A fifth graph G5 illustrates a result when a wavelength of incident light is 656.2725 nm.

Figure 3:
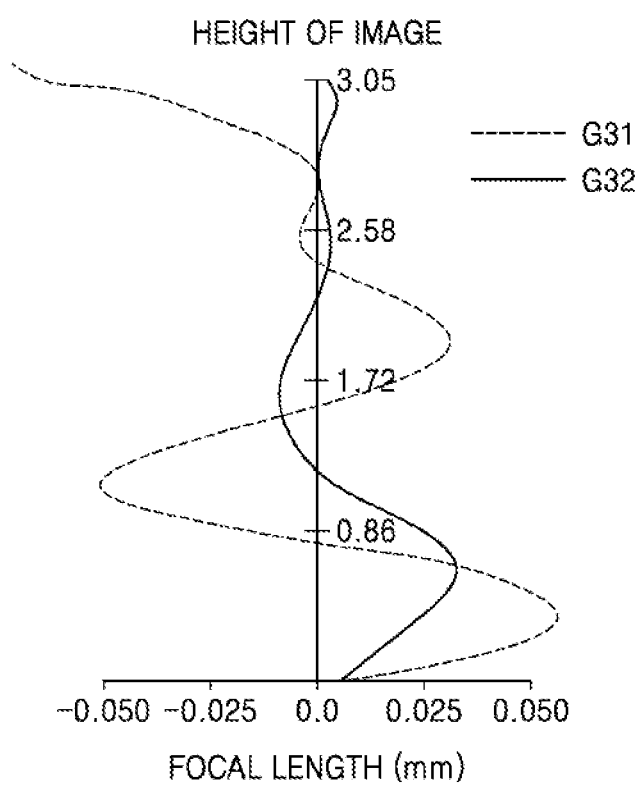

FIG. 3 illustrates astigmatic field curvatures of the first optical lens system 10 when the lenses included in the first optical lens system 10 have dimensions and aspherical coefficients according to the above implementation example. FIG. 3 illustrates results measured by using light having a wavelength of 546.0740 nm.

In FIG. 3, a first graph G31 illustrates a tangential field curvature and a second graph G32 illustrates a sagittal field curvature.

Figure 4:
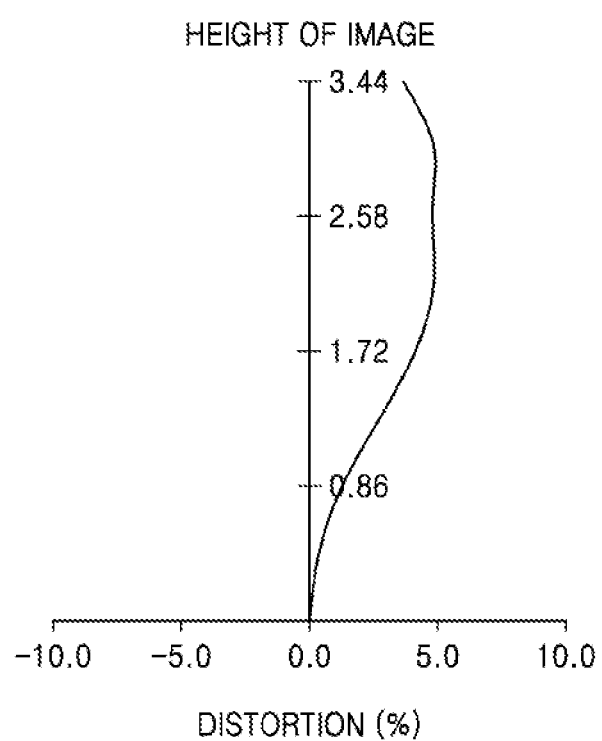

FIG. 4 illustrates distortion of the first optical lens system 10 when the lenses included in the first optical lens system 10 have dimensions and aspherical coefficients according to the above implementation example. A result of FIG. 4 is obtained by using light having a wavelength of 546.0740 nm.

Next, a photographic optical lens system according to another aspect of the disclosed embodiment will be described.

Figure 5:
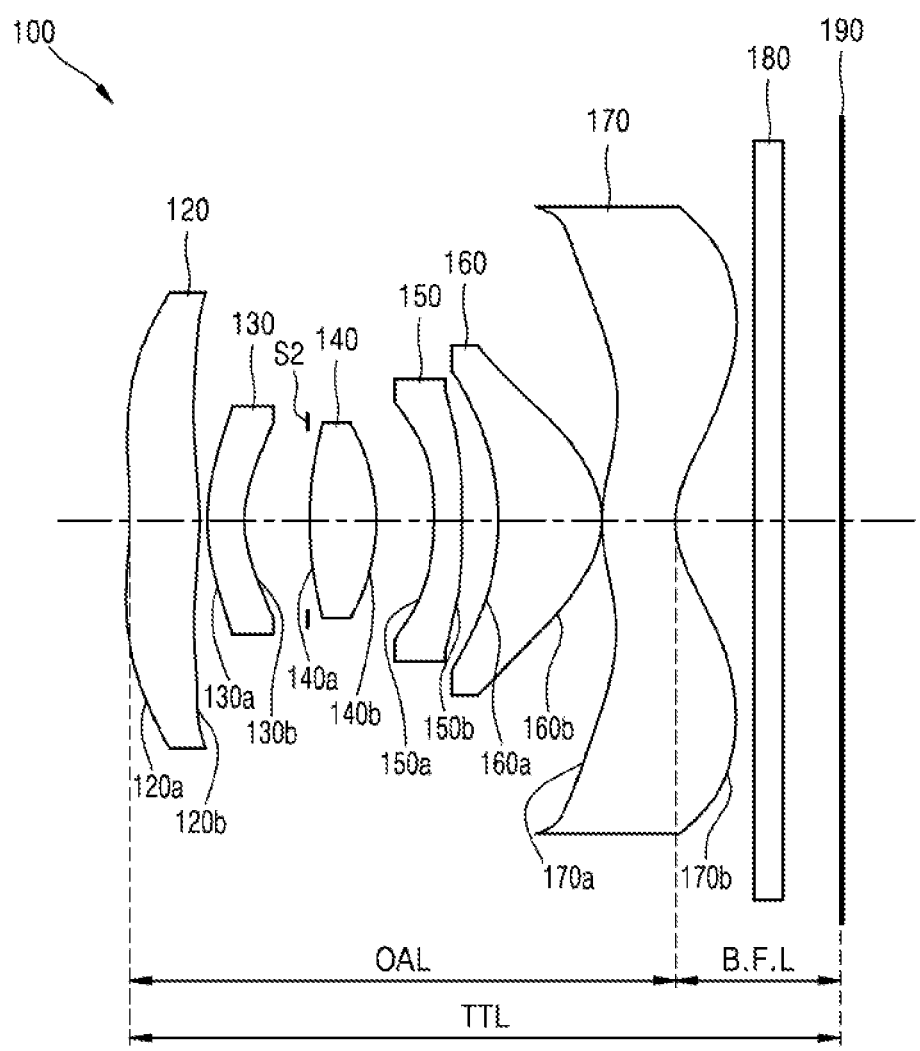
FIG. 5 is a cross-sectional view illustrating a photographic optical lens system (a second optical lens system) according to another aspect of the disclosed embodiment.

FIG. 5 illustrates a photographic optical lens system (hereinafter, referred to as a second optical lens system) according to another aspect of the disclosed embodiment.

Referring to FIG. 5, a second optical lens system 100 includes a plurality of lenses. The plurality of lenses may form one lens group. The plurality of lenses may include at least one aspherical lens. Also, at least one of a light incident surface and light emission surface of one lens, which is selected from the plurality of lenses included in the second optical lens system 100, may be an aspherical surface. The second optical lens system 100 may include first, second, third, fourth, fifth, and sixth lenses 120, 130, 140, 150, 160, and 170. The total number of lenses of the second optical lens system 100 may be more or less than six. The second optical lens system 100 may further include a stop S2, a specific wavelength blocking portion 180, an image sensor 190, and the like in addition to the first to sixth lenses 120 to 170. The first to sixth lenses 120 to 170 may be sequentially arranged between an object to be photographed by the second optical lens system 100 and the image sensor 190. Therefore, the object may be located in front of the first lens 120. The first to sixth lenses 120 to 170 may be non-glass lenses and may be, for example, plastic lenses. The first to sixth lenses 120 to 170 are sequentially arranged from the object toward the image sensor 190.

Light incident on the first lens 120 sequentially passes through the second to sixth lenses 130 to 170 and reaches the image sensor 190. The blocking portion 180 is provided between the sixth lens 170 and the image sensor 190. The blocking portion 180 may be, for example, an infrared blocking filter or a similar member, but the presently disclosed embodiment is not limited thereto, and the blocking portion 180 may be a filter or member which blocks other wavelengths.

The stop S2 may be located between the second lens 130 and a second surface 140b of the third lens 140. For example, the stop S2 may be located between the second lens 130 and the third lens 140. The stop S2 may be located near a first surface 140a of the third lens 140 and may manually or automatically adjust an amount of light incident on the third lens 140. Positions of the stop S2 and the blocking portion 180 may be adjusted as necessary. The image sensor 190 and the blocking portion 180 may be parallel to each other. All of the stop S2, the first to sixth lenses 120 to 170, and the blocking portion 180 may be aligned on the same optical axis. The image sensor 190 may also be aligned on the optical axis.

Next, optical characteristics of the first to sixth lenses 120 to 170 will be described. Some of the first to sixth lenses 120 to 170 may have different refractive powers from those of the other lenses.

Specifically, the first lens 120 may have a positive refractive power and may be an aspherical lens. A first surface 120a of the first lens 120 may be, for example, an aspherical surface. A second surface 120b of the first lens 120 may also be a curved surface having a predetermined curvature and may be, for example, an aspherical surface.

The second lens 130 located next to the first lens 120 may have a negative refractive power. A first surface 130a of the second lens 130 may be a surface which is convex toward the first lens 120. The first surface 130a of the second lens 130 may be, for example, an aspherical surface. The second surface 130b of the second lens 130 may also be a curved surface which is convex toward the first lens 120 and may be, for example, an aspherical surface.

The third lens 140 may be a lens having a positive refractive power. The first surface 140a of the third lens 140 may be a curved surface which is convex toward the second lens 130 and may be, for example, an aspherical surface. The second surface 140b of the third lens 140 may be a curved surface which is convex toward the fourth lens 150 and may be, for example, an aspherical surface. Degrees of asphericality of the first and second surfaces 140a and 140b of the third lens 140 may be different from each other.

The fourth lens 150 may be a lens having a negative refractive power. First and second surfaces 150a and 150b of the fourth lens 150 may be aspherical surfaces. The fourth lens 150 has a convex shape toward the image sensor 190 as a whole.

The fifth lens 160 may be a lens having a positive refractive power. The fifth lens 160 may have a shape which is convex toward the image sensor 190 as a whole. A second surface 160b of the fifth lens 160 may be more convex toward the image sensor 190 than a first surface 160a of the fifth lens 160. All of the first surface 160a and the second surface 160b of the fifth lens 160 may be curved surfaces and may be, for example, aspherical surfaces. A center portion of the fifth lens 160 may be thicker than edges of the fifth lens 160. Degrees of asphericality of the first and second surfaces 160a and 160b of the fifth lens 160 may be different from each other.

The sixth lens 170 may be a lens having a negative refractive power. At least one of first and second surfaces 170a and 170b of the sixth lens 170 may be an aspherical surface. At least one of both of the surfaces of the sixth lens 170 may have at least one inflection point. For example, the second surface 170b of the sixth lens 170 may be an aspherical surface having one or more inflection points. A center portion of the first surface 170a of the sixth lens 170 may be convex toward the object, and portions between edges and the center portion of the sixth lens 170 may be convex toward the image sensor 190. A center region including the optical axis of the second surface 170b of the sixth lens 170 may be concave with respect to the image sensor 190. That is, the center region of the second surface 170b may be convex toward the object. The second surface 170b has regions which are convex toward the image sensor 190 from the center region to the edges. That is, regions of the second surface 170b between the center region and the edges may be convex toward the image sensor 190. Thickest portions of the sixth lens 170 are located between the center region and the edges. A thickness of the center region (e.g., a thickness of a portion through which the optical axis passes) of the sixth lens 170 may be relatively thin.

In the second optical lens system 100, an effective diameter of the first lens 120 may be greater than that of the third lens 140. In another example, the effective diameter of the first lens 120 may be greater than that of the third lens 140. In still another example, the effective diameter of the first lens 120 may be smaller than or equal to that of the sixth lens 170.

The refractive powers of the first to sixth lenses 120 to 170 of the second optical lens system 100 may be dispersed so that an aberration of the second optical lens system 100 is minimized. For example, the first to sixth lenses 120 to 170 may have a refractive power dispersion in which a chromatic aberration of the second optical lens system 100 is minimized. For example, a lens having a relatively low refractive index may be used as the third lens 140, and a lens having a relatively high refractive index may be used as the fourth lens 150.

Also, the optical characteristics of the first to sixth lenses 120 to 170 may vary so that an aberration is minimized. For example, as a method of minimizing a chromatic aberration, a lens having a relatively high Abbe's number may be used as the third lens 140 and a lens having a relatively low Abbe's number may be used as the fourth lens 150.

The first to sixth lenses 120 to 170 are arranged in this way, and thus an aberration of the second optical lens system 100 may be corrected.

A portion of the blocking portion 180 provided next to the sixth lens 170 may come into contact with the second surface 170b of the sixth lens 170 or may be spaced apart from the second surface 170b of the sixth lens 170.

An overall focal length and performance of the second optical lens system 100 may vary according to a thickness, a focal length, a position, and the like of each of the first to sixth lenses 120 to 170 included in the second optical lens system 100.

The following Table 4 illustrates variables related to the above-described Expressions 1 to 7, values of the variables, and values of Expressions 1 to 7 measured with these variable values in the first optical lens system 10.

TABLE 4

| Item | Value |
|---|---|
| IH | 6.87 |
| Semi IH | 3.43 |
| TTL | 5.20 |
| OAL | 3.99 |
| FOV | 99.12 |
| θ | 49.56 |
| E.F.L | 2.82 |
| B.F.L | 1.21 |
| Fno | 1.89 |
| tan(θd/2) | 0.462 |
| DL1 | 3.843 |
| DL3 | 1.640 |
| DL6 | 5.583 |
| $D_{L1-L2}$ | 0.838 |
| Ind3 | 1.544 |
| Ind4 | 1.650 |
| Abv3 | 56.093 |
| Abv4 | 21.474 |
| Expression 1 | 99.12 |
| Expression 2 | 0.76 |
| Expression 3 | Satisfied |
| Expression 4 | Satisfied |
| Expression 5 | 0.21 |
| Expression 6 | 0.94 |
| Expression 7 | 2.61 |

The values of Expressions 1 to 7 in Table 4 are in a range of Expressions 1 to 7. From these results, it may be seen that the second optical lens system 100 satisfies Expressions 1 to 7.

The following Table 5 illustrates an implementation example of optical characteristics for each of the members (the lenses, the stop, the blocking portion, and the image sensor) included in the second optical lens system 100, and illustrates radiuses of curvature (R), lens thicknesses or distances (T) between lenses or adjacent components, refractive indexes (Nd), and Abbe's numbers (Vd). The refractive index (Nd) denotes a refractive index of a lens measured using a d-line. The Abbe's number (Vd) denotes an Abbe's number of a lens with respect to a d-line. A mark * after a surface number indicates that the corresponding surface is an aspherical surface. Units of values of R and T are mm.

TABLE 5

| Component | Surface | R | T | Nd | Vd |
|---|---|---|---|---|---|
| First lens 120 | 120a* | −5.44904 | 0.50563 | 1.53175 | 55.85588 |
|  | 120b* | −2.40268 | 0.06216 | — | — |
| Second lens 130 | 130a* | 1.69043 | 0.27051 | 1.63916 | 23.51650 |
|  | 130b* | 1.19932 | 0.39624 | — | — |
| Stop S2 |  | Infinity | 0.09090 | — | — |
| Third lens 140 | 140a* | 4.45305 | 0.47367 | 1.54410 | 56.09278 |
|  | 140b* | −2.37343 | 0.41628 | — | — |
| Fourth lens 150 | 150a* | −3.56713 | 0.20000 | 1.65041 | 21.47439 |
|  | 150b* | −25.55904 | 0.25889 | — | — |
| Fifth lens 160 | 160a* | −2.29470 | 0.75886 | 1.54410 | 56.09278 |
|  | 160b* | −0.83514 | 0.03000 | — | — |
| Sixth lens 170 | 170a* | 1.92788 | 0.52656 | 1.53175 | 55.85588 |
|  | 170b* |  | 0.72734 | 0.56066 | — |
| Blocking portion 180 | Front surface | Infinity | 0.21000 | 1.51680 | 64.19733 |
|  | Back surface | Infinity | 0.43894 | — | — |
| Image sensor 190 |  | Infinity | 0.00069 |  |  |

The aspherical surface of each of the first to sixth lenses 120 to 170 included in the second optical lens system 100 also satisfy Expression 8.

The following Table 6 illustrates aspherical coefficients of the lenses included in the second optical lens system 100.

TABLE 6

| Surface | K | A | B | C | D | E |
|---|---|---|---|---|---|---|
| 120a* | −106.27524 | 0.08632 | −0.04788 | 0.02348 | −0.00730 | 0.00139 |
| 120b* | −102.67840 | 0.09552 | −0.12788 | 0.14318 | −0.11263 | 0.05919 |
| 130a* | −0.24386 | 0.36427 | −2.94190 | 11.42789 | −32.13067 | 61.99330 |
| 130b* | 0.82909 | −0.41380 | 1.01855 | −8.27195 | 40.19410 | −129.57881 |
| 140a* | 1.01221 | −0.00039 | −0.00355 | −0.79117 | 6.20825 | −25.21447 |
| 140b* | 1.60343 | −0.14009 | 0.94956 | −7.49554 | 35.66161 | −107.99058 |
| 150a* | 6.74108 | −0.26434 | 0.26153 | −2.25130 | 10.21451 | −24.43358 |
| 150b* | 356.96640 | −0.11588 | −0.13558 | 0.26860 | 0.05848 | −0.53780 |
| 160a* | 1.73356 | 0.16873 | −0.16790 | −0.01954 | 0.20147 | −0.18831 |
| 160b* | −0.86994 | 0.32456 | −0.47399 | 0.65419 | −0.67735 | 0.44816 |
| 170a | −16.38430 | −0.05763 | −0.04030 | 0.04547 | −0.01986 | 0.00498 |
| 170b | −4.32224 | −0.08060 | 0.03767 | −0.01599 | 0.00521 | −0.00122 |

| Surface | F | G | H | J |
|---|---|---|---|---|
| 120a* | −0.00022 | 0.00006 | −0.00001 | 0.00000 |
| 120b* | −0.02057 | 0.00456 | −0.00059 | 0.00003 |
| 130a* | −79.19102 | 63.81958 | −29.31929 | 5.84503 |
| 130b* | 273.52660 | −363.65088 | 275.43980 | −90.77175 |
| 140a* | 59.17009 | −80.39069 | 58.82370 | −17.84899 |
| 140b* | 208.59512 | −248.36244 | 165.90213 | −47.44261 |
| 150a* | 35.42803 | −30.83975 | 14.76694 | −2.98842 |
| 150b* | 0.73469 | −0.51074 | 0.18402 | −0.02727 |
| 160a* | 0.11039 | −0.05888 | 0.02321 | −0.00396 |
| 160b* | −0.15377 | 0.01454 | 0.00493 | −0.00103 |
| 170a* | −0.00074 | 0.00006 | 0.00000 | 0.00000 |
| 170b* | 0.00019 | −0.00002 | 0.00000 | 0.00000 |

Figure 6:
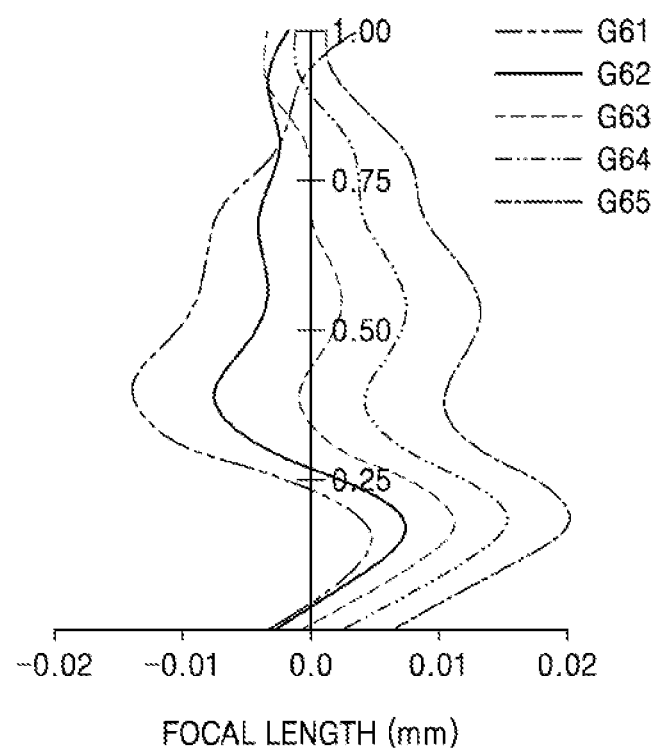
FIGS. 6 to 8 are aberration diagrams illustrating longitudinal spherical aberrations, astigmatic field curvatures, and distortion of the second optical lens system.
Figure 7:
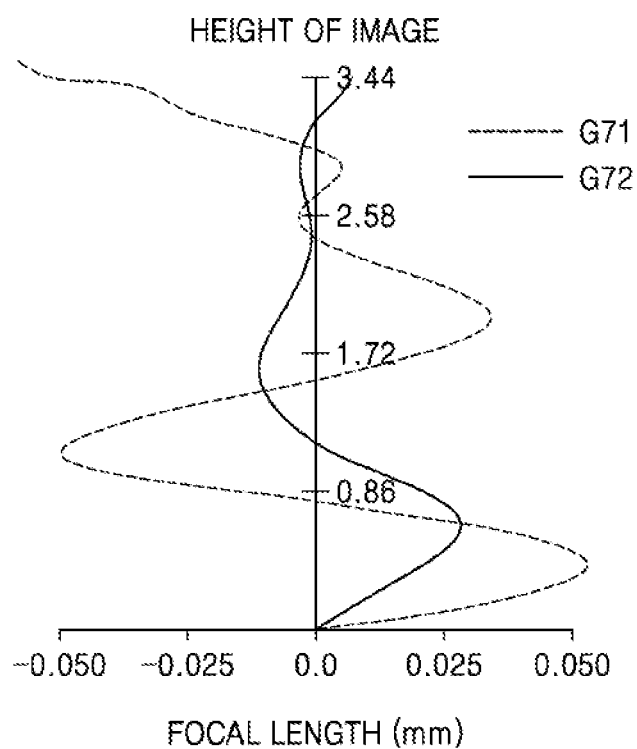
Figure 8:
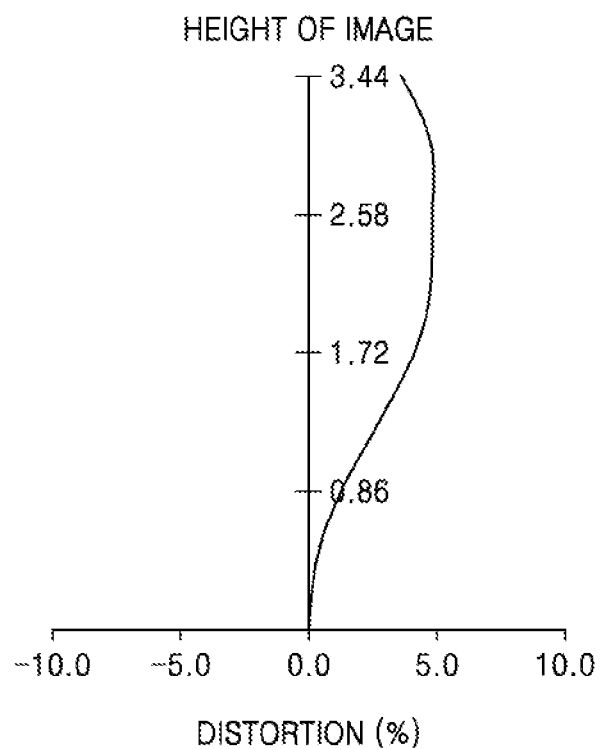

FIGS. 6 to 8 illustrate longitudinal spherical aberrations, astigmatic field curvatures, and distortion of the second optical lens system 100 when the lenses included in the second optical lens system 100 have dimensions and aspherical coefficients according to the above implementation example. Light used for obtaining the results of FIGS. 6 to 8 may be the same as the light used for obtaining the results of FIGS. 2 to 4.

First to fifth graphs G61 to G65 of FIG. 6 respectively correspond to the first to fifth graphs G1 to G5 of FIG. 2. Also, first and second graphs G71 and G72 of FIG. 7 respectively correspond to the first and second graphs G31 and G32 of FIG. 3.

Next, a photographic optical lens system according to still another aspect of the disclosed embodiment will be described.

Figure 9:
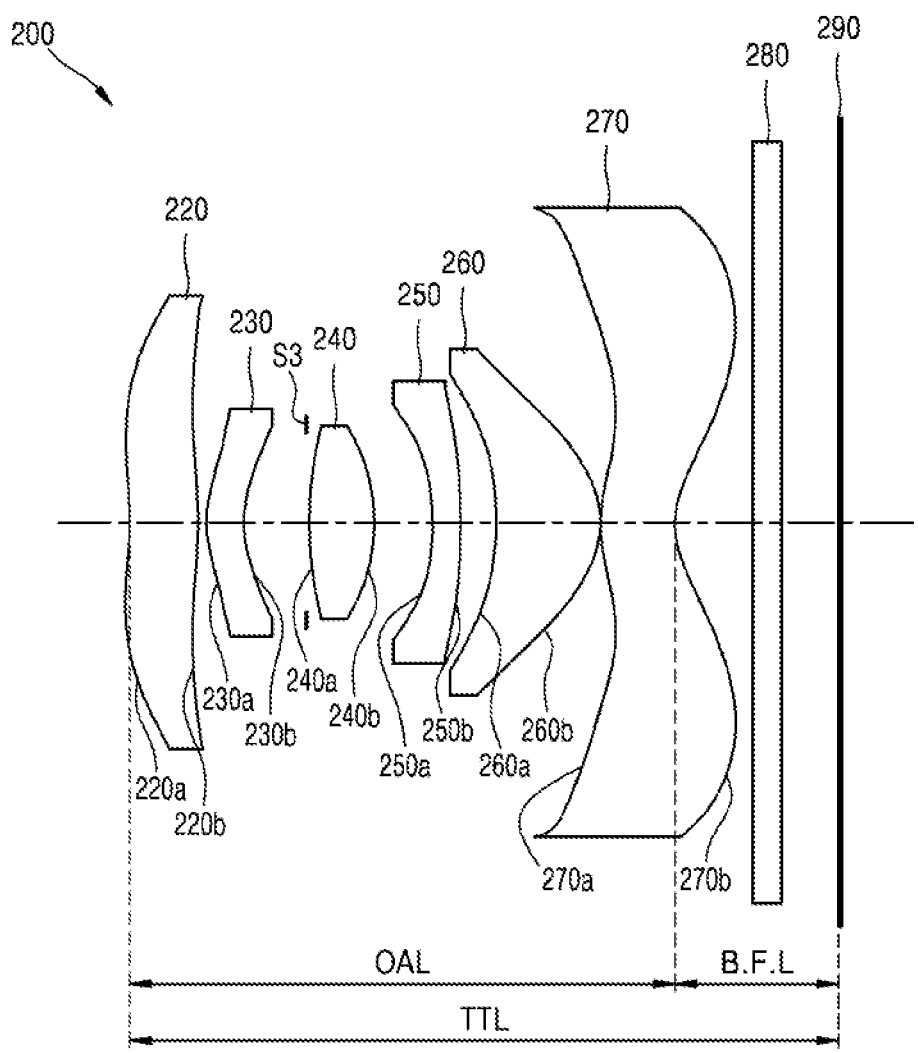
FIG. 9 is a cross-sectional view illustrating a photographic optical lens system (a third optical lens system) according to still another aspect of the disclosed embodiment.

FIG. 9 illustrates the photographic optical lens system (hereinafter, referred to as a third optical lens system) according to still another aspect of the disclosed embodiment.

Referring to FIG. 9, a third optical lens system 200 may include a lens group similar to the first and second optical lens systems 10 and 100. A plurality of lenses included in the lens group may include at least one aspherical lens. Also, at least one of a light incident surface and light emission surface of one lens, which is selected from the plurality of lenses included in the third optical lens system 200, may be an aspherical surface. The third optical lens system 200 may include six lenses 220 to 270. The total number of lenses of the third optical lens system 200 may be more or less than six. The third optical lens system 200 may further include a stop S3, a specific wavelength blocking portion 280, an image sensor 290, and the like in addition to the six lenses 220 to 270. The first, second, third, fourth, fifth, and sixth lenses 220 to 270 may be sequentially arranged between an object to be photographed by the third optical lens system 200 and the image sensor 290. Therefore, the object may be located in front of the first lens 220. The first to sixth lenses 220 to 270 may be non-glass lenses and may be, for example, plastic lenses. The first to sixth lenses 220 to 270 are sequentially arranged from the object toward the image sensor 290.

Light incident on the first lens 220 sequentially passes through the second to sixth lenses 230 to 270 and reaches the image sensor 290. The blocking portion 280 is provided between the sixth lens 270 and the image sensor 290. The blocking portion 280 may be, for example, an infrared blocking filter or a similar member, but the presently disclosed embodiment is not limited thereto, and the blocking portion 280 may be a filter or member which blocks other wavelengths. The stop S3 may be located between the second lens 230 and a second surface 240b of the third lens 240. For example, the stop S3 may be located between the second lens 230 and the third lens 240. The stop S3 may be located near a first surface 240a of the third lens 240 and may manually or automatically adjust an amount of light incident on the third lens 240. Positions of the stop S3 and the blocking portion 280 may be adjusted as necessary. The image sensor 290 and the blocking portion 280 may be parallel to each other. All of the stop S3, the first to sixth lenses 220 to 270, and the blocking portion 280 may be aligned on the same optical axis. The image sensor 290 may also be aligned on the optical axis.

Next, optical characteristics of the first to sixth lenses 220 to 270 will be described. Some of the first to sixth lenses 220 to 270 may have different refractive powers from those of the other lenses.

Specifically, the first lens 220 may be a lens having a positive refractive power. The first lens 220 may be an aspherical lens. A first surface 220a of the first lens 220 may be an aspherical surface. A second surface 220b of the first lens 220 may be a curved surface having a predetermined curvature and may be, for example, an aspherical surface.

The second lens 230 may be a lens having a negative refractive power. A first surface 230a of the second lens 230 may be a surface which is convex toward the first lens 220. The first surface 230a of the second lens 230 may be, for example, an aspherical surface. A second surface 230b of the second lens 230 may also be a curved surface which is convex toward the first lens 220 and may be, for example, an aspherical surface.

The third lens 240 may be a lens having a positive refractive power. The first surface 240a of the third lens 240 may be a curved surface which is convex toward the second lens 230 and may be, for example, an aspherical surface. The second surface 240b of the third lens 240 may be a curved surface which is convex toward the image sensor 290 and may be, for example, an aspherical surface. Degrees of asphericality of the first and second surfaces 240a and 240b of the third lens 240 may be different from each other.

The fourth lens 250 may be a lens having a negative refractive power. First and second surfaces 250a and 250b of the fourth lens 250 may be aspherical surfaces. The fourth lens 250 may have a convex shape toward the image sensor 290 as a whole.

The fifth lens 260 may be a lens having a positive refractive power. The fifth lens 260 may have a shape which is convex toward the image sensor 290 as a whole. A second surface 260b of the fifth lens 260 may be more convex toward the image sensor 290 than a first surface 260a of the fifth lens 260. All of the first surface 260a and the second surface 260b of the fifth lens 260 may be curved surfaces and may be, for example, aspherical surfaces. A center portion of the fifth lens 260 may be thicker than edges of the fifth lens 260. Degrees of asphericality of the first and second surfaces 260a and 260b of the fifth lens 260 may be different from each other.

The sixth lens 270 may be a lens having a negative refractive power. At least one of first and second surfaces 270a and 270b of the sixth lens 270 may be an aspherical surface. At least one of both of the surfaces of the sixth lens 270 may have at least one inflection point. For example, the second surface 270b of the sixth lens 270 may be an aspherical surface having one or more inflection points. A center portion of the first surface 270a of the sixth lens 270 may be convex toward the object. However, portions between the center portion and edges of the first surface 270a may be convex toward the image sensor 290. A center region including the optical axis of the second surface 270b of the sixth lens 270 may be concave with respect to the image sensor 290. That is, the center region of the second surface 270b may be convex toward the object. The second surface 270b has regions which are convex toward the image sensor 290 from the center region to the edges. That is, regions of the second surface 270b between the center region and the edges may be convex toward the image sensor 290. Thickest portions of the sixth lens 270 are located between the center region and the edges. A thickness of the center region (e.g., a thickness of a portion through which the optical axis passes) of the sixth lens 270 may be relatively thin.

In the third optical lens system 200, an effective diameter of the first lens 220 may be greater than that of the third lens 240. For example, the effective diameter of the first lens 220 may be equal to or greater than that of the third lens 240. In another example, the effective diameter of the first lens 220 may be smaller than or equal to that of the sixth lens 270.

The refractive powers of the first to sixth lenses 220 to 270 of the third optical lens system 200 may be dispersed so that an aberration of the third optical lens system 200 is minimized. For example, the first to sixth lenses 220 to 270 may have a refractive power dispersion in which a chromatic aberration of the third optical lens system 200 is minimized. For example, a lens having a relatively low refractive index may be used as the third lens 240, and a lens having a relatively high refractive index may be used as the fourth lens 250.

Also, the optical characteristics of the first to sixth lenses 220 to 270 may vary so that an aberration is minimized. For example, as a method of minimizing a chromatic aberration, a lens having a relatively high Abbe's number may be used as the third lens 240 and a lens having a relatively low Abbe's number may be used as the fourth lens 250.

In the third optical lens system 200, the first to sixth lenses 220 to 270 are arranged in this way, and thus an aberration of the third optical lens system 200 may be corrected.

A portion of the blocking portion 280 provided next to the sixth lens 270 may come into contact with the second surface 270b of the sixth lens 270 or may be spaced apart from the second surface 270b of the sixth lens 270.

An overall focal length and performance of the third optical lens system 200 may vary according to a thickness, a focal length, a position, and the like of each of the first to sixth lenses 220 to 270 included in the third optical lens system 200.

The following Table 7 illustrates variables related to the above-described Expressions 1 to 7, values of the variables, and values of Expressions 1 to 7 measured with these variable values in the third optical lens system 200.

TABLE 7

| Item | Value |
|---|---|
| IH | 6.87 |
| Semi IH | 3.43 |
| TTL | 5.20 |
| OAL | 4.01 |
| FOV | 98.92 |
| θ | 49.46 |
| E.F.L | 2.83 |
| B.F.L | 1.19 |
| Fno | 1.89 |
| tan(θd/2) | 0.461 |
| DL1 | 3.782 |
| DL3 | 1.660 |
| DL6 | 5.702 |
| $D_{L1\text{-}L2}$ | 0.853 |

TABLE 7-continued

| Item | Value |
|---|---|
| Ind3 | 1.544 |
| Ind4 | 1.639 |
| Abv3 | 56.093 |
| Abv4 | 23.517 |
| Expression 1 | 98.92 |
| Expression 2 | 0.76 |
| Expression 3 | Satisfied |
| Expression 4 | Satisfied |
| Expression 5 | 0.21 |
| Expression 6 | 0.94 |
| Expression 7 | 2.39 |

The values of Expressions 1 to 7 in Table 7 are in the range of Expressions 1 to 7. Therefore, it may be seen that the third optical lens system 200 also satisfies Expressions 1 to 7.

The following Table 8 illustrates an implementation example of optical characteristics for each of the members (the lenses, the stop, the blocking portion, and the image sensor) included in the third optical lens system 200, and illustrates radiuses of curvature (R), lens thicknesses or distances (T) between the lenses or adjacent components, refractive indexes (Nd), and Abbe's numbers (Vd). The refractive index (Nd) denotes a refractive index of a lens measured using a d-line. The Abbe's number (Vd) denotes an Abbe's number of a lens with respect to a d-line. A mark * after a surface number indicates that the corresponding surface is an aspherical surface. Units of values of R and T are mm.

TABLE 8

| Component | Surface | R | T | Nd | Vd |
|---|---|---|---|---|---|
| First lens 220 | 220a* | −5.67700 | 0.49137 | 1.53175 | 55.85588 |
|  | 220b* | −2.45419 | 0.06818 | — | — |
| Second lens 230 | 230a* | 1.68712 | 0.29354 | 1.63916 | 23.51650 |
|  | 230b* | 1.18827 | 0.40781 | — | — |
| Stop S3 |  | Infinity | 0.07544 |  |  |
| Third lens 240 | 240a* | 3.89121 | 0.47992 | 1.54410 | 56.09278 |
|  | 240b* | −2.56440 | 0.40893 | — | — |
| Fourth lens 250 | 250a* | −3.43376 | 0.20000 | 1.63916 | 23.51650 |
|  | 250b* | −24.69074 | 0.22990 | — | — |
| Fifth lens 260 | 260a* | −2.48594 | 0.77873 | 1.54410 | 56.09278 |
|  | 260b* | −0.87018 | 0.03000 | — | — |
| Sixth lens 270 | 270a* | 1.93808 | 0.55094 | 1.53175 | 55.85588 |
|  | 270b* | 0.74407 | 0.56066 | — | — |
| Blocking portion 280 | Front surface | Infinity | 0.21000 | 1.51680 | 64.19733 |
|  | Back surface | Infinity | 0.41333 | — | — |
| Image sensor 290 |  | Infinity | 0.00123 |  |  |

The aspherical surface of each of the first to sixth lenses 220 to 270 included in the third optical lens system 200 satisfy Expression 8.

The following Table 9 illustrates aspherical coefficients of each surface of the lenses included in the third optical lens system 200.

TABLE 9

| Surface | K | A | B | C | D | E |
|---|---|---|---|---|---|---|
| 220a* | −96.51954 | 0.09079 | −0.05750 | 0.03337 | −0.01424 | 0.00474 |
| 220b* | −89.05781 | 0.08826 | −0.11634 | 0.12751 | −0.09736 | 0.04976 |
| 230a* | −0.18732 | 0.26033 | −2.01495 | 6.79782 | −17.16013 | 30.59851 |
| 230b* | 0.82345 | −0.44162 | 1.56904. | −13.44060 | 69.13900 | −230.75298 |
| 240a* | 1.80512 | 0.00195 | −0.06971 | −0.15765 | 2.95436 | −15.35725 |
| 240b* | 1.55626 | −0.13191 | 0.71777 | −5.62696 | 26.28551 | −77.94579 |
| 250a* | 6.87682 | −0.27024 | 0.16475 | −2.26420 | 11.39031 | −27.89602 |
| 250b* | 135.85730 | −0.06475 | −0.36147 | 0.67292 | −0.29718 | −0.38418 |
| 260a* | 1.81911 | 0.24991 | −0.29235 | 0.01569 | 0.37655 | −0.45177 |
| 260b* | −0.87317 | 0.31798 | −0.45982 | 0.64106 | −0.67504 | 0.46473 |
| 270a | −12.04534 | −0.07702 | −0.03333 | 0.05076 | −0.02492 | 0.00687 |
| 270b | −4.16813 | −0.07851 | 0.03330 | −0.01126 | 0.00281 | −0.00050 |

| Surface | F | G | H | J |
|---|---|---|---|---|
| 220a* | −0.00132 | 0.00029 | −0.00004 | 0.00000 |
| 220b* | −0.01681 | 0.00361 | −0.00045 | 0.00002 |
| 230a* | −36.83343 | 28.35302 | −12.55851 | 2.42942 |
| 230b* | 495.65192 | −661.49763 | 498.28334 | −162.17304 |
| 240a* | 41.45228 | −62.24450 | 49.55720 | −16.23274 |
| 240b* | 147.14972 | −170.72170 | 110.79375 | −30.63908 |
| 250a* | 40.63591 | −35.34601 | 16.88664 | −3.40690 |
| 250b* | 0.71705 | −0.51770 | 0.18372 | −0.02630 |
| 260a* | 0.27389 | −0.10352 | 0.02484 | −0.00289 |
| 260b* | −0.16864 | 0.01793 | 0.00540 | −0.00122 |
| 270a* | −0.00113 | 0.00010 | 0.00000 | 0.00000 |
| 270b* | 0.00006 | 0.00000 | 0.00000 | 0.00000 |

Figure 10:
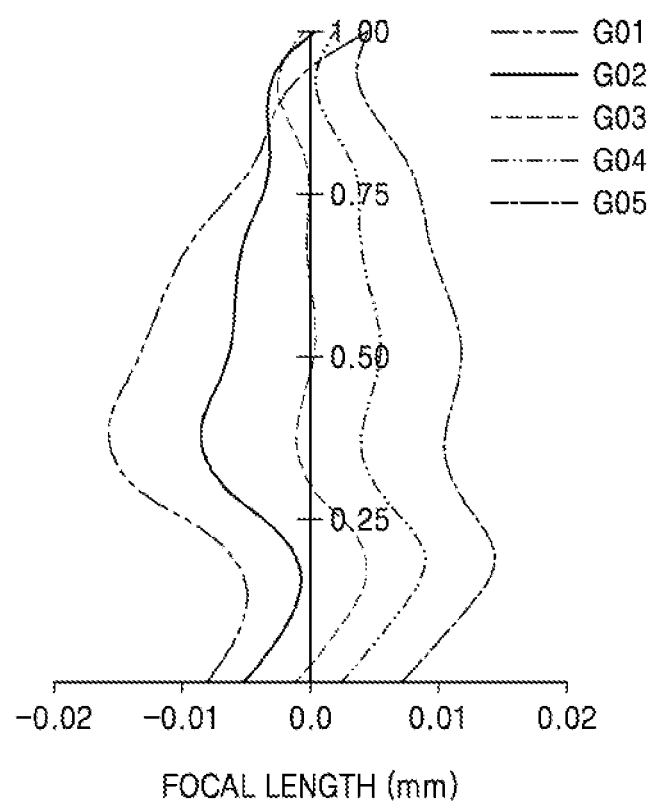
FIGS. 10 to 12 are aberration diagrams illustrating longitudinal spherical aberrations, astigmatic field curvatures, and distortion of the third optical lens system.
Figure 11:
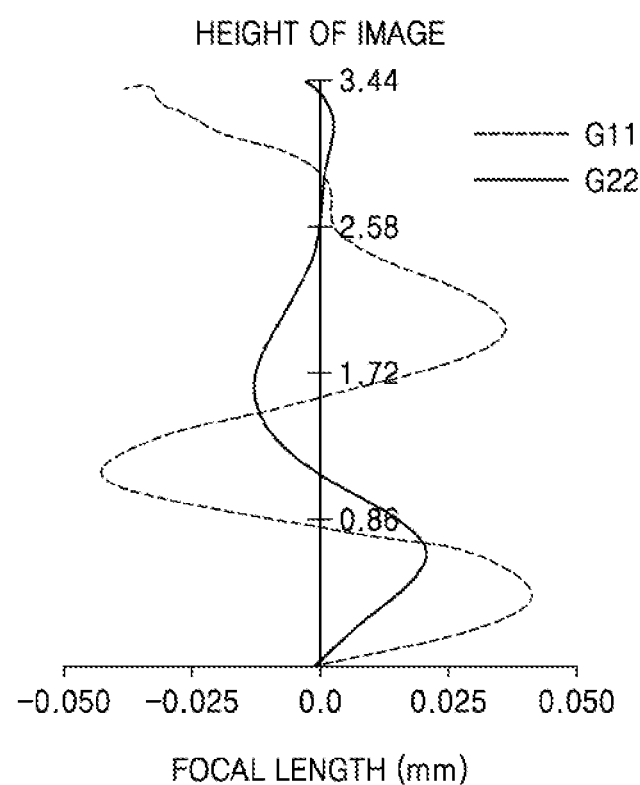
Figure 12:
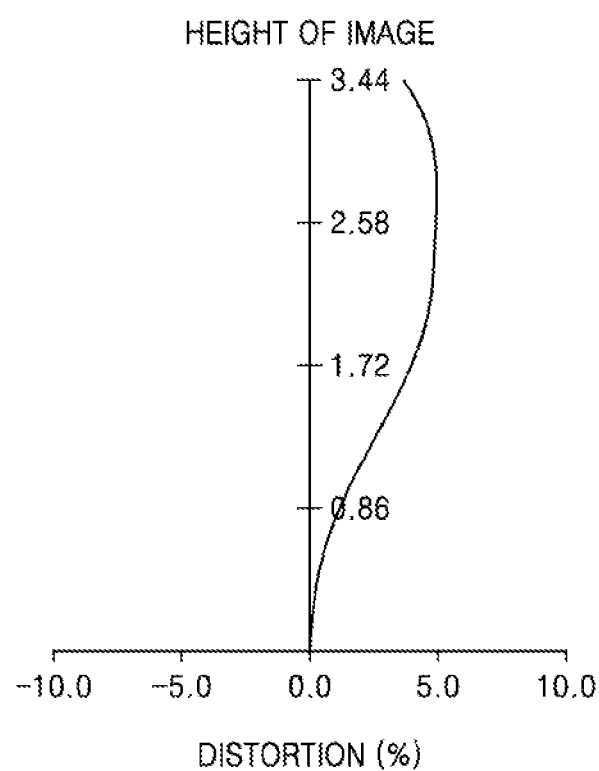

FIGS. 10 to 12 illustrate longitudinal spherical aberrations, astigmatic field curvatures, and distortion of the third optical lens system 200 when the lenses included in the third optical lens system 200 have dimensions and aspherical coefficients according to the above implementation example. Light used for obtaining the results of FIGS. 10 to 12 may be the same as the light used for obtaining the results of FIGS. 2 to 4.

First to fifth graphs G01 to G05 of FIG. 10 may respectively correspond to the first to fifth graphs G1 to G5 of FIG. 2. Also, first and second graphs G11 and G22 of FIG. 11 may respectively correspond to the first and second graphs G31 and G32 of FIG. 3.

The disclosed photographic optical lens systems satisfy Expressions 1 to 7. Therefore, since the disclosed optical lens systems satisfy Expressions 1 to 5, a relatively wide viewing angle, that is, a wide angle, along with high resolution may be secured.

Also, since the refractive power distributions of the lenses of the disclosed optical lens systems are adjusted so that the disclosed optical lens systems satisfy Expressions 6 and 7, various aberrations including a chromatic aberration in the disclosed optical lens systems may be corrected.

In addition, since the total lengths of the disclosed optical lens systems are defined so that the disclosed optical lens systems satisfy Expression 2 with respect to sizes of image sensors, the entire optical lens systems may be miniaturized and slimmed. Accordingly, the disclosed optical lens systems may be applied to various apparatuses requiring a compact size and a wide angle while requiring image capturing, and may be applied to, for example, mobile communication devices, security cameras, action cameras, drones, and the like.

Also, since a low sensitivity design may be achieved while implementing a high optical performance due to a power arrangement dispersion according to an appropriate stop position setting, mass production may also be ensured.

Also, since each lens is made of plastic and an aspherical surface is applied thereto, a weight of the lens may be reduced, a manufacturing cost may be reduced, and a compact photographing lens having a high resolution and a wide angle may be implemented when compared to the lens made of glass.

While many details have been described in the above description, these will be construed as exemplary aspects of the disclosed embodiment rather than limiting the scope of the inventive concept. Therefore, the technical scope of the inventive concept is not defined by the described aspects of the disclosed embodiment, but will be defined by the scope of the appended claims.

It should be understood that aspects of the disclosed embodiment described herein should be considered in a descriptive sense only and not for purposes of limitation. Descriptions of features within each aspect of the disclosed embodiment should typically be considered as available for other similar features in other aspects of the disclosed embodiment.

While one or more aspects of the disclosed embodiment have been described with reference to the figures, it will be understood by those of ordinary skill in the art that various changes in form and details may be made therein without departing from the spirit and scope of the disclosure as defined by the following claims.

What is claimed is:

1. An optical lens system comprising:
a stop;
a lens group including at least one aspherical lens; and
an image sensor configured to record an image transmitted through the lens group,
wherein the optical lens system satisfies the following expressions:

$$0.15 \leq (DL1\text{-}L2)/OAL \leq 0.4,$$

$$0.6 \leq TTL/IH \leq 0.9$$

where DL1-L2 denotes a distance from a center of a first surface of a first lens closest to an object to a center of a second surface of a second lens arranged directly next to the first lens, and OAL denotes a distance of a total length of the lens group from the center of the first surface of the first lens to a center of a second surface of a lens arranged farthest from the object, and wherein IH denotes a height of an effective image and TTL denotes a distance from a center of the first surface of the first lens to the image sensor;
wherein the lens group includes a total of six lenses sequentially arranged on the same optical axis, including the first and second lenses.

2. The optical lens system of claim 1, further comprising a specific wavelength blocking portion provided between the lens group and the image sensor.

3. The optical lens system of claim 1, wherein the stop is arranged next to the second lens.

4. The optical lens system of claim 1, wherein a refractive power of an odd-numbered lens and a refractive power of an even-numbered lens among the plurality of lenses included in the lens group are opposite to each other.

5. The optical lens system of claim 1, wherein an effective diameter of the first lens among the six sequentially arranged lenses is greater than an effective diameter of a third lens and is smaller than an effective diameter of a sixth lens.

6. The optical lens system of claim 1, wherein an effective diameter of the first lens among the six sequentially arranged lenses is equal to an effective diameter of a third lens.

7. The optical lens system of claim 1, wherein an effective diameter of the first lens among the six sequentially arranged lenses is equal to an effective diameter of a sixth lens.

8. The optical lens system of claim 1, wherein an effective diameter of the first lens among the six sequentially arranged lenses, an effective diameter of a third lens, and an effective diameter of a sixth lens are the same.

9. The optical lens system of claim 1, wherein a refractive index of a third lens among the six sequentially arranged lenses is smaller than a refractive index of a fourth lens.

10. The optical lens system of claim 1, wherein an Abbe's number of a third lens among the six sequentially arranged lenses is greater than an Abbe's number of a fourth lens.

11. The optical lens system of claim 1, wherein the first lens, a third lens, and a sixth lens among the six sequentially arranged lenses satisfy the following Expression:

$$DL3 \leq DL1 \leq DL6$$

where DL1, DL3, and DL6 respectively denote effective diameters of the first lens, the third lens, and the sixth lens.

12. The optical lens system of claim 1, wherein a third lens and a fourth lens among the six sequentially arranged lenses satisfy the following Expression:

$$0.7 \leq Ind3/Ind4 \leq 1.5$$

where Ind3 denotes a refractive index of the third lens and Ind4 denotes a refractive index of the fourth lens.

13. The optical lens system of claim 1, wherein the optical lens system satisfies the following Expression:

$$85 \leq FOV \leq 150$$

where FOV denotes an effective viewing angle of the optical lens system.

14. The optical lens system of claim 3, wherein, when a lens arranged next to the second lens is referred to as a third lens, the stop is arranged between a second surface of the third lens and the second lens.

15. The optical lens system of claim 10, wherein the third lens and the fourth lens satisfy the following Expression:

$$1.5 \leq Abv3/Abv4 \leq 3.0$$

where Abv3 denotes the Abbe's number of the third lens and Abv4 denotes the Abbe's number of the fourth lens.

* * * * *